(12) United States Patent
Incerpi et al.

(10) Patent No.: US 11,300,086 B2
(45) Date of Patent: Apr. 12, 2022

(54) FUEL AND OIL SYSTEM

(71) Applicant: ROLLS-ROYCE plc, London (GB)

(72) Inventors: Gian Incerpi, Buckingham (GB); Edward W Adams, Berlin (DE)

(73) Assignee: ROLLS-ROYCE plc, London (GB)

( * ) Notice: Subject to any disclaimer, the term of this patent is extended or adjusted under 35 U.S.C. 154(b) by 723 days.

(21) Appl. No.: 15/446,584

(22) Filed: Mar. 1, 2017

(65) Prior Publication Data

US 2017/0284351 A1 Oct. 5, 2017

(30) Foreign Application Priority Data

Mar. 30, 2016 (GB) ...................................... 1605270

(51) Int. Cl.
*H02P 29/024* (2016.01)
*F02C 7/22* (2006.01)
*F02M 59/20* (2006.01)
*H02P 6/04* (2016.01)
*F02C 9/26* (2006.01)
*F01D 25/20* (2006.01)
(Continued)

(52) U.S. Cl.
CPC ............. *F02M 59/20* (2013.01); *F01D 25/20* (2013.01); *F01M 1/02* (2013.01); *F02C 7/06* (2013.01); *F02C 7/22* (2013.01); *F02C 7/236* (2013.01); *F02C 9/26* (2013.01); *F02M 37/08* (2013.01); *H02K 9/00* (2013.01); *H02P 6/04* (2013.01); *H02P 29/024* (2013.01); *H02P 29/0241* (2016.02); *F01M 2001/0215* (2013.01); *F05D 2260/84* (2013.01); *Y02T 50/60* (2013.01)

(58) Field of Classification Search
CPC .... F02C 7/22; F02C 7/32; F02C 7/236; F02C 9/26; F02C 9/46; F02C 9/30; F05D 2260/98; F05D 2270/094; F01D 25/20; F01M 1/02; F02M 37/08; F02M 2037/085
See application file for complete search history.

(56) References Cited

U.S. PATENT DOCUMENTS 5,152,141 A * 10/1992 Rumford ................ B64D 41/00
60/778
7,114,482 B2 * 10/2006 Lane ........................ F01M 1/02
123/196 R
(Continued)

FOREIGN PATENT DOCUMENTS

EP 3 012 438 A1 4/2016
RU 2507407 C1 2/2014

OTHER PUBLICATIONS

Sep. 12, 2016 Search Report issued in British Patent Application No. GB 1605270.6.
(Continued)

*Primary Examiner* — Todd E Manahan
*Assistant Examiner* — Sean V Meiller
(74) *Attorney, Agent, or Firm* — Oliff PLC

(57) ABSTRACT

A fuel and oil system includes a fuel pump, an oil pump, and a fixed electrical drive. A first electric motor controller of the fuel and oil system supplies a variable electrical drive, and a second electric motor controller supplies a variable electrical drive. The fuel pump is selectively connected to and driven by the first electric motor controller or the second electric motor controller. The oil pump is selectively connected to and driven by the second electric motor controller or the fixed electrical drive.

9 Claims, 8 Drawing Sheets

(51) Int. Cl.
*F02C 7/236* (2006.01)
*H02K 9/00* (2006.01)
*F01M 1/02* (2006.01)
*F02C 7/06* (2006.01)
*F02M 37/08* (2006.01)

(56) References Cited

U.S. PATENT DOCUMENTS

| | | | |
|---|---|---|---|
| 8,195,376 B2 * | 6/2012 | Yuzaki | F02D 41/062 |
| | | | 123/447 |
| 8,443,582 B1 | 5/2013 | Phillips et al. | |
| 2004/0187833 A1 * | 9/2004 | Lane | F01M 1/02 |
| | | | 123/196 R |
| 2009/0102410 A1 * | 4/2009 | Bretschneider | G07C 3/00 |
| | | | 318/561 |
| 2012/0161676 A1 | 6/2012 | White et al. | |
| 2014/0060658 A1 | 3/2014 | Hains et al. | |
| 2016/0247620 A1 * | 8/2016 | Murray | H01F 27/10 |

OTHER PUBLICATIONS

Aug. 21, 2017 Search Report issued in European Patent Application No. 17158633.

* cited by examiner

Figure 2: Related Art

FUEL AND OIL SYSTEM

The present disclosure concerns a fuel and oil system. In particular, but not exclusively, it concerns a fuel and oil system for a gas turbine engine.

BACKGROUND

In a gas turbine engine it is known to have a fuel system including a fuel pump driven at variable speed by a motor. The motor is controlled by a controller. Similarly it is common to have an oil system including an oil pump driven at fixed or variable speed by a motor. Where the motor drives at variable speed it is also controlled by a controller.

Generally it is considered critical that the variable speed control of the fuel system is maintained throughout operation of the gas turbine engine. Therefore it is common to provide two motors and controllers to drive the fuel system in order to provide redundancy. Although variable speed control of the oil system is less critical it is still common to duplicate the oil system motor and controller for redundancy.

Motors for fuel and oil systems may be hydraulically or mechanically driven. However, there is a desire to move towards electrically driven motors.

SUMMARY

According to a first aspect of the present invention there is provided a fuel and oil system comprising:
a fuel pump;
an oil pump;
a first electric motor controller configured to supply a variable electrical drive;
a second electric motor controller configured to supply a variable electrical drive; and
a fixed electrical drive;
wherein the fuel pump is selectively connected to and driven by the first electric motor controller or the second electric motor controller; and
wherein the oil pump is selectively connected to and driven by the second electric motor controller or the fixed electrical drive.

In a first configuration of the system the fuel pump is connected to and driven by the first electric motor controller and the oil pump is connected to and driven by the second electric motor controller. Advantageously the system provides independent, fully variable control of the fuel pump and oil pump. Advantageously this enables each of the fuel system and the oil system to operate at efficient pump speed and optimal flow rates so there is little or no excess supply and consequential spill back of fuel or oil.

In a second configuration of the system the fuel pump is connected to and driven by the second electric motor controller and the oil pump is connected to and driven by the fixed electrical drive. Advantageously, when the first electric motor controller is faulty and so unable to control the fuel pump, the system maintains fully variable control of the fuel pump by switching it to the second electric motor controller instead of the first electric motor controller. Advantageously there is no requirement for a normally-redundant variable electrical drive motor controller for the fuel pump.

In a third configuration of the system the fuel pump is connected to and driven by the first electric motor controller and the oil pump is connected to and driven by the fixed electrical drive. Advantageously, when the second electric motor controller is faulty and so unable to control the oil pump, the system maintains fully variable control of the fuel pump but switches the oil pump control to the fixed electrical drive instead of the second electric motor controller. Advantageously there is no requirement for a normally-redundant variable electrical drive motor controller for the oil pump.

Advantageously the system provides electrical drive to the fuel pump and the oil pump in any operational mode. Advantageously both the fuel pump and oil pump have redundancy of control. Advantageously variable electrical drive is maintained to the fuel pump by switching from variable to fixed electrical drive for the oil pump if one of the variable electrical motor controllers fails. Advantageously the system includes fewer components than in known arrangements without sacrificing redundancy, and therefore safety, and whilst maintaining variable control of the fuel pump.

The system may comprise a spill valve connected to an output of the oil pump. Advantageously excess oil can be spilt to an oil tank and reused. Advantageously the oil pump can be configured to run at maximum flow rates without penalty so that it can be operated via the fixed electrical drive for extended periods of time. The spilt oil may be cooled before being delivered to the oil tank. Advantageously this reduces the overall temperature of oil in the oil system.

The first electric motor controller and the second electric motor controller may be different. Advantageously this reduces the potential for common mode faults affecting both the first and second electric motor controllers. Alternatively the first electric motor controller and the second electric motor controller may be the same type. Advantageously this means the electric motor controllers are interchangeable which reduces the part count and thus the required spare part stock. It also ensures that the first and second electric motor controllers are wholly substitutable and therefore provides good redundancy.

The system may further comprise a cooling arrangement. The cooling system may comprise a first cooling loop arranged to cool the first electric motor controller and a second cooling loop arranged to cool the second electric motor controller. Advantageously each cooling loop may be optimised to the electric motor controller it is arranged to cool. Alternatively the cooling system may comprise a common cooling loop arranged to cool both the first electric motor controller and the second electric motor controller. Advantageously the common cooling loop may comprise fewer parts than two separate loops.

There is also provided a gas turbine engine comprising a fuel and oil system as described above. There is also provided a diesel engine comprising a fuel and oil system as described above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
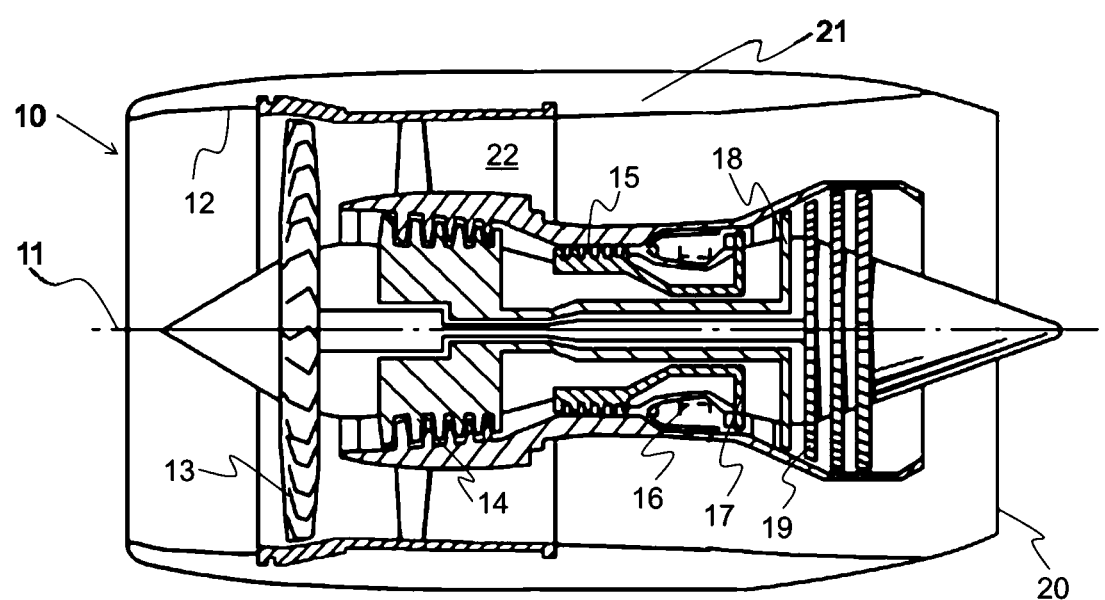
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
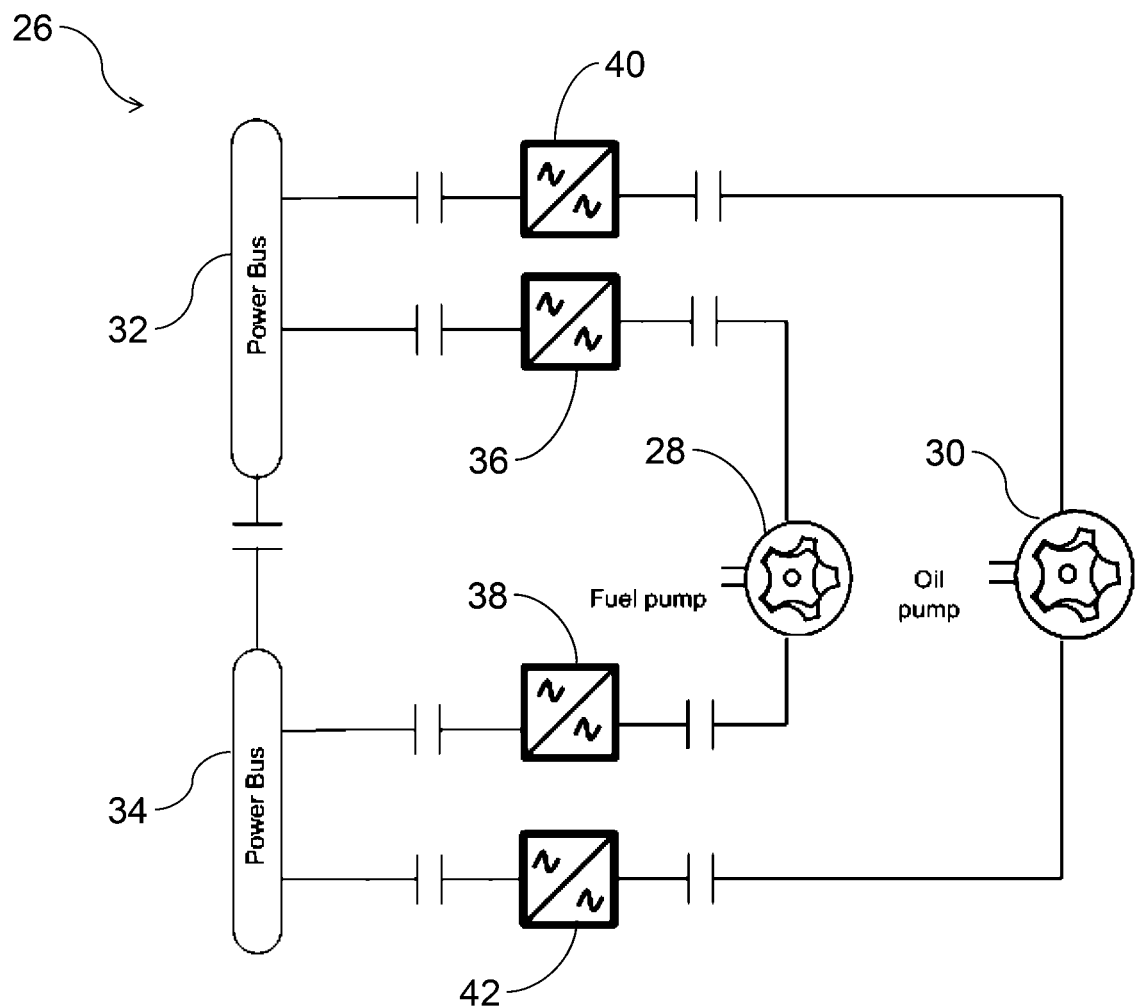
FIG. 2 is a schematic illustration of a dual redundant fuel and oil system.

FIG. 2 shows a commonly used dual redundant motor control system 26. A fuel pump 28 is driven by an electric motor (not shown). An oil pump 30 is driven by an electric motor (not shown). A first power bus 32 is arranged to provide electrical power. A second power bus 34 is arranged to provide electrical power independently of the first power bus 32. The motor for the fuel pump 28 is controlled by a first electric motor controller 36 or a second electric motor controller 38. The first electric motor controller 36 is powered by the first power bus 32 whereas the second electric motor controller 38 is powered by the second power bus 34. Thus one of the first and second electric motor controllers 36, 38 is usually used to drive the electric motor of the fuel pump 28 and the other of the first and second electric motor controllers 36, 38 is normally dormant but is available to take over control in the event of failure of the usually driving electric motor controller 36, 38. The fuel pump 28 has redundant motor control.

Similarly the motor for the oil pump 30 is controlled by a third electric motor controller 40 or a fourth electric motor controller 42. The third electric motor controller 40 is powered by the first power bus 32 whereas the fourth electric motor controller 42 is powered by the second power bus 34. Thus one of the third and fourth electric motor controllers 40, 42 is usually used to drive the electric motor of the oil pump 30 and the other of the third and fourth electric motor controllers 40, 42 is normally dormant but is available to take over control in the event of failure of the usually driving electric motor controller 40, 42. The oil pump 30 thus also has redundant motor control. The motor control system 26 is therefore a dual redundant system.

In a gas turbine engine 10, particularly a gas turbine engine 10 used to power an aircraft, it is beneficial to reduce the number of motor controllers 36, 38, 40, 42 to reduce weight. However, it is also important not to sacrifice the safety provided by motor controller redundancy. The fuel and oil system 50 of the present invention addresses these considerations.

Figure 3:
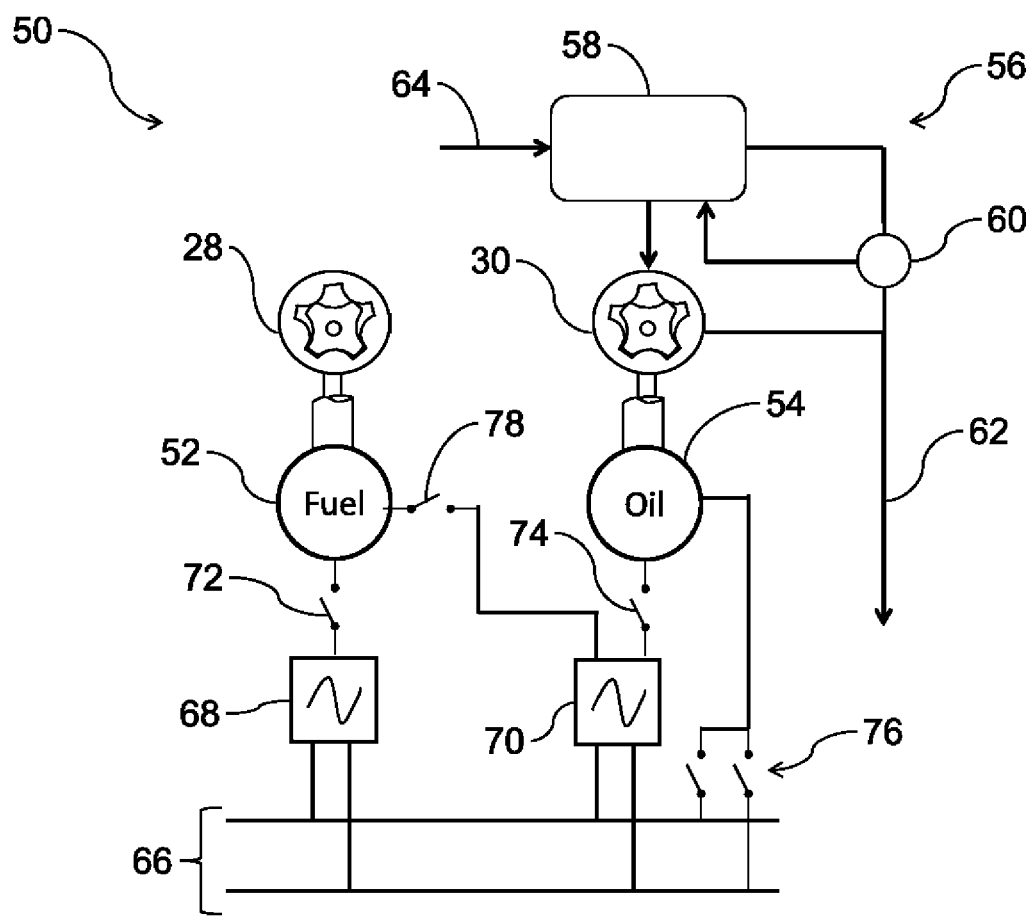
FIG. 3 is a schematic illustration of a fuel and oil system as described herein.

The fuel and oil system 50 is illustrated in FIG. 3. The fuel pump 28 is driven by an electric fuel motor 52. The oil pump 30 is similarly driven by an electric oil motor 54. Part of the oil system 56 is shown. An oil tank 58 delivers oil to the oil pump 30 which pumps the oil to the engine 10, arrow 62. When an excess of oil is pumped a spill valve 60 is opened to spill some of the oil back to the oil tank 58, which incurs some additional heating of the oil. The oil system 56 is generally closed loop. Therefore, the oil tank 58 is supplied from scavenge of oil which has been used in the engine 10, as indicated by arrow 64.

The fuel system is not shown for simplicity. Broadly fuel is supplied from a fuel tank to the fuel pump 28 which delivers fuel to combustor 16 of the engine 10. The fuel system is open loop, although if excess fuel is provided to the fuel pump 28 it can be spilled back to the fuel tank. It is beneficial not to oversupply fuel to the fuel pump 28 as the act of pumping it works the fuel and therefore heats it and increases the cooling requirement in the fuel system 52 and the oil system 54.

A power source 66 is illustrated as two busbars. Other forms of suitable power source 66 can be substituted with equal felicity.

A first electric motor controller 68 is connected to the power source 66. The first electric motor controller 68 is a variable controller. It is configured to supply electrical drive at a variable output speed or frequency. The first electric motor controller 68 is selectively electrically coupled to or connected to the electric fuel motor 52 to drive the motor 52 and thence the fuel pump 28 at a variable speed as required by the engine control system. A first switch 72 may be provided between the first electric motor controller 68 and the electric fuel motor 52. Closing the first switch 72 electrically couples or connects the first electric motor controller 68 to the electric fuel motor 52 while opening the first switch 72 electrically isolates the electric fuel motor 52 from the first electric motor controller 68.

A second electric motor controller 70 is connected to the power source 66. The second electric motor controller 70 is also a variable controller. It is configured to supply electrical drive at a variable output speed or frequency. The second electric motor controller 70 is selectively electrically coupled to or connected to the electric oil motor 54 to drive the motor 54 and thence the oil pump 30 at a variable speed as required by the engine control system. A second switch 74 may be provided between the second electric motor controller 70 and the electric oil motor 54. Closing the second switch 74 electrically couples or connects the second electric motor controller 70 to the electric oil motor 54 while opening the second switch 74 electrically isolates the electric oil motor 54 from the second electric motor controller 70.

The second electric motor controller 70 is also selectively electrically coupled to or connected to the electric fuel motor 52 to drive the motor 52 and thence the fuel pump 28 at a variable speed. In the event of a fault in the first electric motor controller 68 the second electric motor controller 70 can be coupled to the electric fuel motor 52 to provide the variable electrical drive so that fully variable control is possible in all operational conditions. The first electric motor controller 68 can be isolated from the electric fuel motor 52 by opening first switch 72. The second electric motor controller 70 can be electrically coupled or connected to the electric fuel motor 52 by closing a third switch 78.

The fuel and oil system 50 also includes a fixed electrical drive 76. The fixed electrical drive 76 is selectively electrically coupled or connected to the electric oil motor 54 to drive the motor 54 and thence the oil pump 30 at a constant speed. The fixed electrical drive 76 may comprise, as illustrated, a pair of switches to directly electrically couple or connect the power source 66 to the electric oil motor 54. It is less efficient to drive the oil pump 30 at constant speed because excess oil is pumped and therefore heated which must be spilt through the spill valve 60 back to the oil tank 58. Preferably the spilt oil should be cooled before being delivered back to the oil tank 58 to reduce the overall temperature of the oil in the oil system 56.

Figure 4:
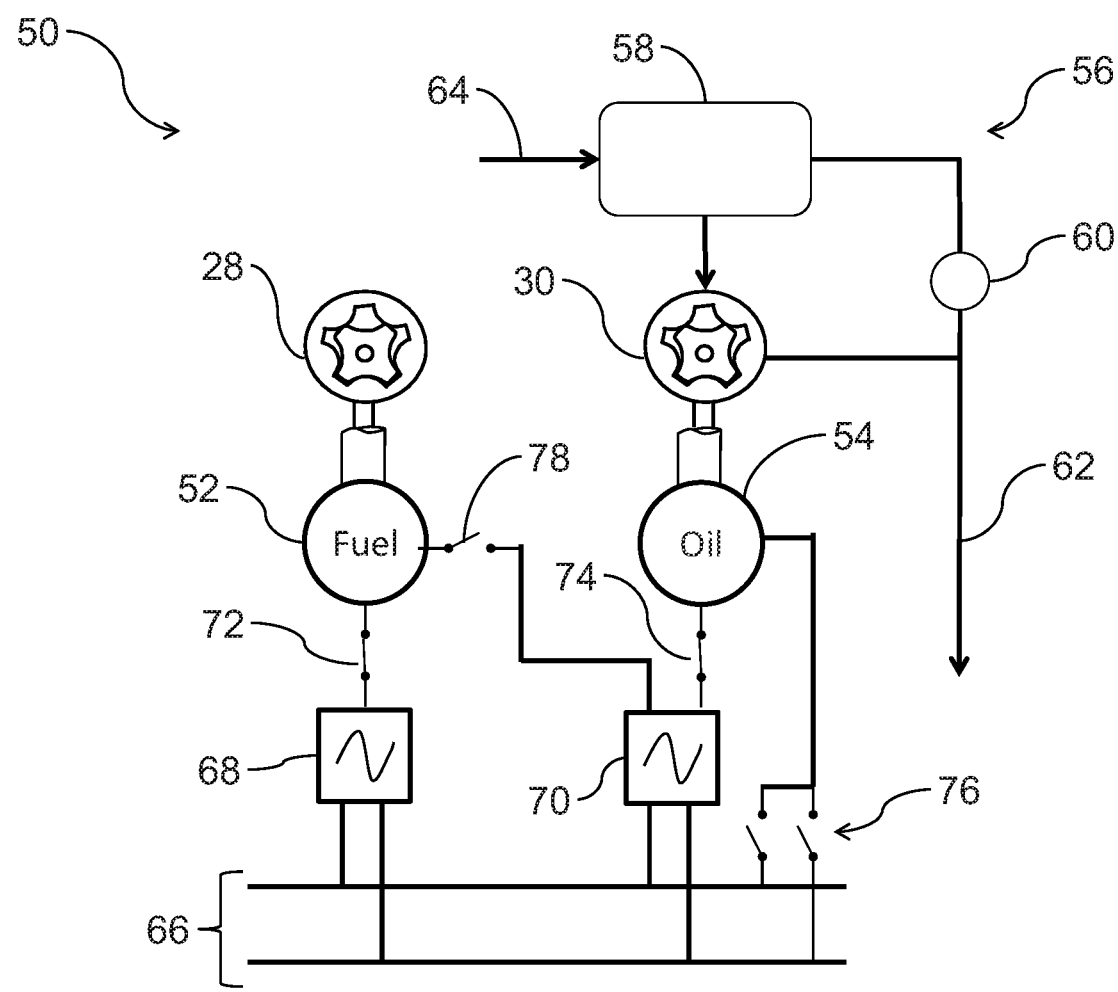
FIG. 4 is a schematic illustration of the system of FIG. 3 in a first configuration.

FIG. 4 shows the system of FIG. 3 in a first operating configuration. In the first configuration there are no faults in the fuel and oil system 50. The electric fuel motor 52 is electrically coupled to or connected to the first electric motor controller 68 via closed first switch 72. The electric oil motor 54 is electrically coupled to or connected to the second electric motor controller 70 via closed second switch 74. Third switch 78 is open so that there is no electrical connection from the second electric motor controller 70 to the electric fuel motor 52. The fixed electrical drive 76 is electrically disconnected or decoupled from the electric oil motor 54, for example by opening the switches.

In the first configuration the fuel and oil system 50 provides independent, fully variable control of the electric fuel motor 52 and fuel pump 28, and of the electric oil motor 54 and oil pump 30. Advantageously this enables each part of the system, the fuel system and the oil system 56, to be operated at an efficient pump speed and to minimise cooling requirements by minimising the excess supply and consequential spill back of fuel or oil.

Figure 5:
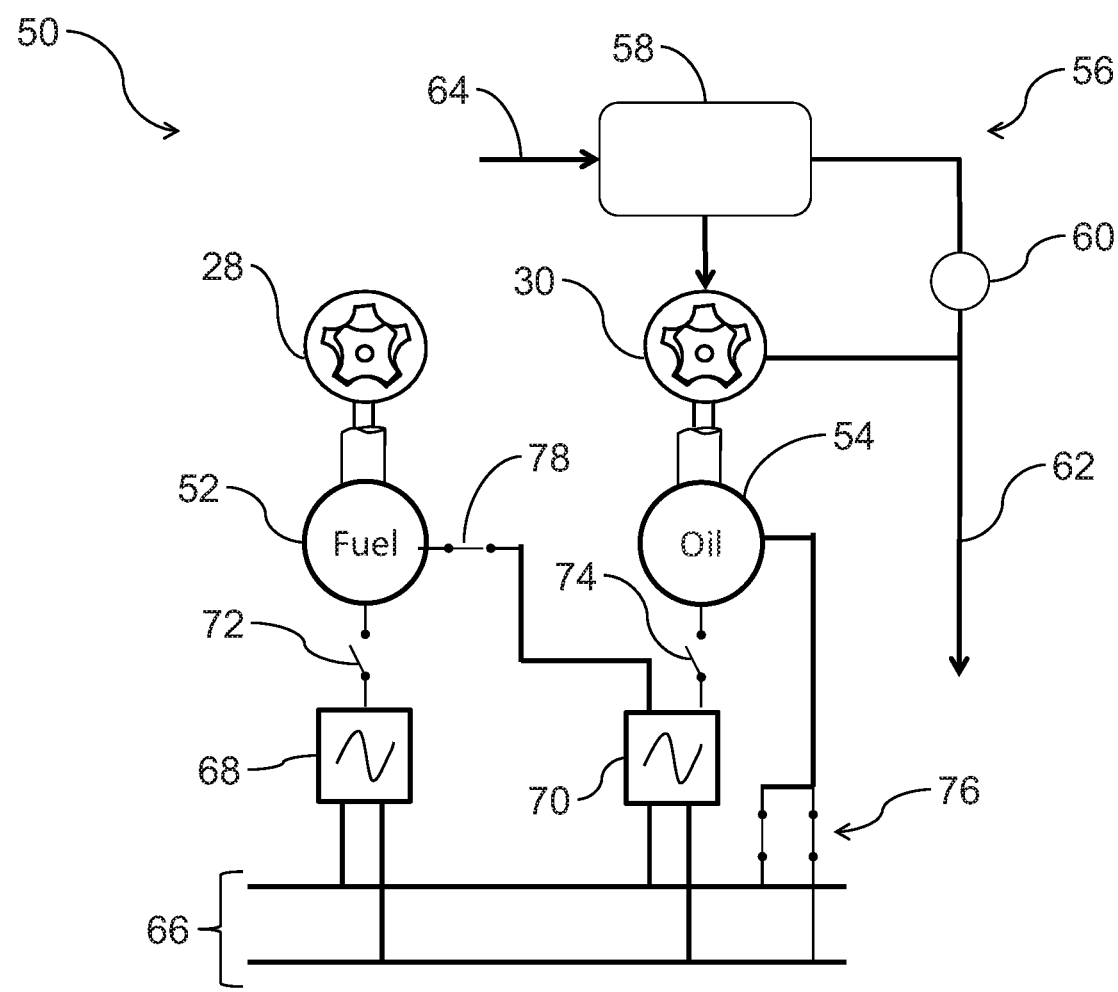
FIG. 5 is a schematic illustration of the system of FIG. 3 in a second configuration.

FIG. 5 shows the system of FIG. 3 in a second operating configuration. In the second configuration there is a fault in the first electric motor controller 68, which is therefore unable to control the electric fuel motor 52. In order to maintain fully variable control of the electric fuel motor 52 the electrical connection to the faulty first electric motor controller 68 is isolated by opening the first switch 72 and the electric fuel motor 52 is instead electrically coupled or connected to the second electric motor controller 70 by closing the third switch 78. At the same time the second switch 74 is opened to isolate the electric oil motor 54 from the second electric motor controller 70, so that the second electric motor controller 70 is not overloaded, and the electric oil motor 54 is electrically coupled or connected to the fixed electrical drive 76, by closing the switches.

In the second configuration, therefore, there is fully variable control of the electric fuel motor 52 and fuel pump 28 but the oil pump 30 is operated at fixed speed by the electric oil motor 54. Advantageously both the fuel system and oil system 56 have redundancy of control. The second configuration sacrifices variable control of the oil system 56 in order to maintain fully variable control of the electric fuel motor 52 and fuel pump 28 without having to provide a normally-redundant variable output motor controller for the fuel system.

Figure 6:
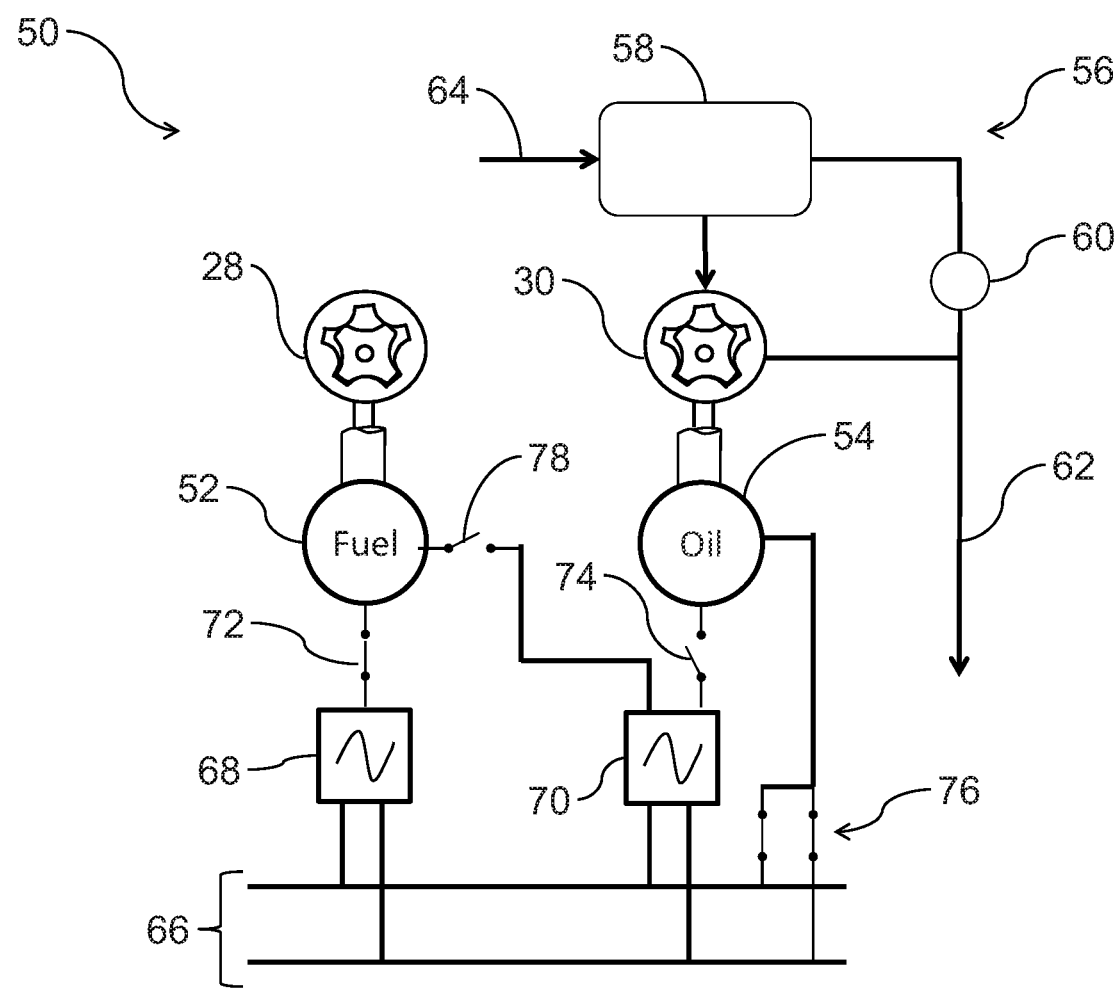
FIG. 6 is a schematic illustration of the system of FIG. 3 in a third configuration.

FIG. 6 shows the fuel and oil system 50 in a third configuration. In the third configuration there is a fault in the second electric motor controller 70, which is therefore unable to control the electric oil motor 54. The first electric motor controller 68 is unaffected and therefore fully variable control of the electric fuel motor 52 is provided, as in the first configuration, by the first electric motor controller 68 through closed first switch 72. Both the second and third switches 74, 78 are opened to isolate the faulty second electric motor controller 70 from the electric fuel motor 52 and from the electric oil motor 54. Instead the fixed electrical drive 76 is electrically coupled or connected to the electric oil motor 54, for example by closing the switches, in order that the electric oil motor 54 can drive the oil pump 30 at constant speed.

In the third configuration, therefore, there is fully variable control of the electric fuel motor 52 and fuel pump 28 but the oil pump 30 is operated at fixed speed by the electric oil motor 54. Advantageously both the fuel system and oil system 56 have redundancy of control. The third configuration sacrifices variable control of the oil system 56 and so does not have to provide a normally-redundant variable output motor controller for the oil system 56.

Advantageously the fuel and oil system 50 as described has operating configurations suitable for normal running and which account for failure of the first or second electric motor controllers 68, 70. In each operating configuration fully variable control of the fuel system is maintained. Where necessary variable control of the oil system 56 is replaced by fixed speed control of the oil pump 30 because the oil can be more easily cooled.

Advantageously the fuel and oil system 50 as described requires only two variable output electric motor controllers 68, 70 compared to the arrangement described with respect to FIG. 2 which has four such motor controllers 36, 38, 40, 42. Consequently there is a benefit in terms of weight, cooling requirements, part count and complexity without sacrificing redundancy in the control of each part of the system 50. The fuel pump 28 and oil pump 30 are controlled independently so each can be driven at an optimal speed in the first configuration. The fuel pump 28 can also be driven at an optimal speed in the second and third configurations where one or the other of the first and second electric motor controllers 68, 70 is faulty.

The fixed electrical drive 76 is set at a size to provide sufficient electrical power to the electric oil motor 54 to drive the oil pump 30 for the most severe operating conditions. Where the fuel and oil system 50 forms part of a gas turbine engine 10 to power an aircraft the fastest (most severe) speed requirement for the oil pump 30 is at maximum take-off thrust. Thus both the fixed electrical drive 76 and the electric oil motor 54 are sized to supply sufficient power to operate the oil pump 30 at the maximum take-off speed for extended operation. Advantageously this ensures that where the fuel and oil system 50 must operate in the second or third configuration due to a fault in the first or second electric motor controller 68, 70 it is not necessary to restrict operation of the gas turbine engine 10. Alternatively a smaller fixed electrical drive 76 may be provided and suitable restrictions placed on operation of the gas turbine engine 10 to compensate when the fuel and oil system 50 is operated in the second or third configurations.

Where the power source 66 is multiphase, for example three-phase, a coarse level of speed control can be provided for the oil pump 30 by the fixed electrical drive 76. The fixed electrical drive 76 may supply one or more of the phases of the power source 66 to the electric oil motor 54 and therefore provide more than one constant power level to drive the oil pump 30. The oil pump 30 can therefore be driven at a finite number of speeds corresponding to the number of phases available in the power source 66 which can be switched in or out by the fixed electrical drive 76. This contrasts to the operation in the first configuration where the oil pump 30 is controlled fully variably. By providing more than one constant speed of operation of the oil pump 30 in the second and third configurations of the fuel and oil system 50 the oversupply of oil, and consequent spill back and cooling requirements, can be reduced. Some oversupply is still expected since it is unlikely that the available constant speeds corresponding to the phases of the power source 66 will match all (or even any) of the desired speeds for operation of the oil pump 30. Advantageously a single phase of the power source 66 could be arranged to correspond to the minimum speed requirement of the oil pump 30.

Optionally the fuel and oil system 50 may include a controller or control function which actively manages opening and closing of the first, second and third switches 72, 74, 78 and electrical coupling or connection of the fixed electrical drive 76. Advantageously this may smooth the input to the electric fuel motor 52 during switching between the first and second electric motor controllers 68, 70 and/or may smooth the input to the electric oil motor 54 during switching between the second electric motor controller 70 and the fixed electrical drive 76.

Alternatively the electrical coupling or connection, and decoupling or disconnection, of the electric fuel and oil motors 52, 54 to the first and second electric motor controllers 68, 70 and fixed electrical drive 76 may be managed passively. That means that the electric fuel motor 52 may be arranged or configured to try to draw power from the second electric motor controller 70 when no power or a reduced amount of power is being supplied from the first electric motor controller 68, and similarly the electric oil motor 54 may be arranged or configured to try to draw power from the fixed electrical drive 76 when no power or a reduced amount of power is being supplied from the second electric motor controller 70.

The first electric motor controller 68 may be identical to the second electric motor controller 70 so that they are entirely interchangeable. Advantageously this reduces the part count of the fuel and oil system 50. Advantageously it also ensures that the controllers 68, 70 are wholly substitutable and therefore provide excellent redundancy.

Alternatively the first electric motor controller 68 may differ from the second electric motor controller 70. The available power output of each controller 68, 70 may be the same to provide the redundancy to permit either controller 68, 70 to drive either the electric fuel motor 52 or the electric oil motor 54. The second electric motor controller 70 may have a larger maximum power output than the first electric motor controller 68 in order to absorb any demand surge during switching from controlling the electric oil motor 54 to controlling the electric fuel motor 52 (switching from the first to the second configurations of the fuel and oil system 50). Advantageously, by providing dissimilar electric motor controllers 68, 70 common mode failures are reduced or eliminated. Thus where an external event causes failure of the first electric motor controller 68 the second electric motor controller 70 may not be affected and vice versa.

Figure 7:
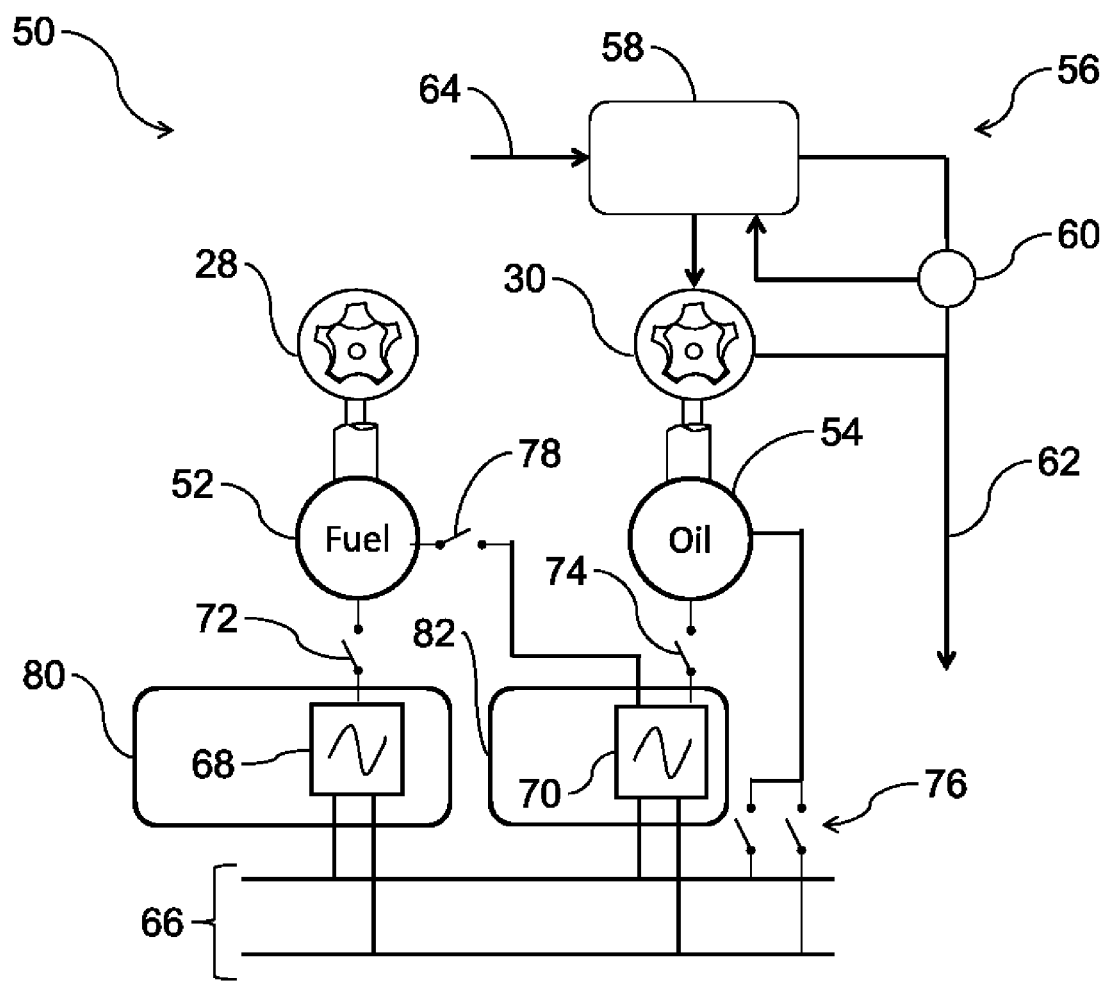
FIG. 7 is a schematic illustration of the fuel and oil system as described herein including a cooling arrangement in a first configuration.
Figure 8:
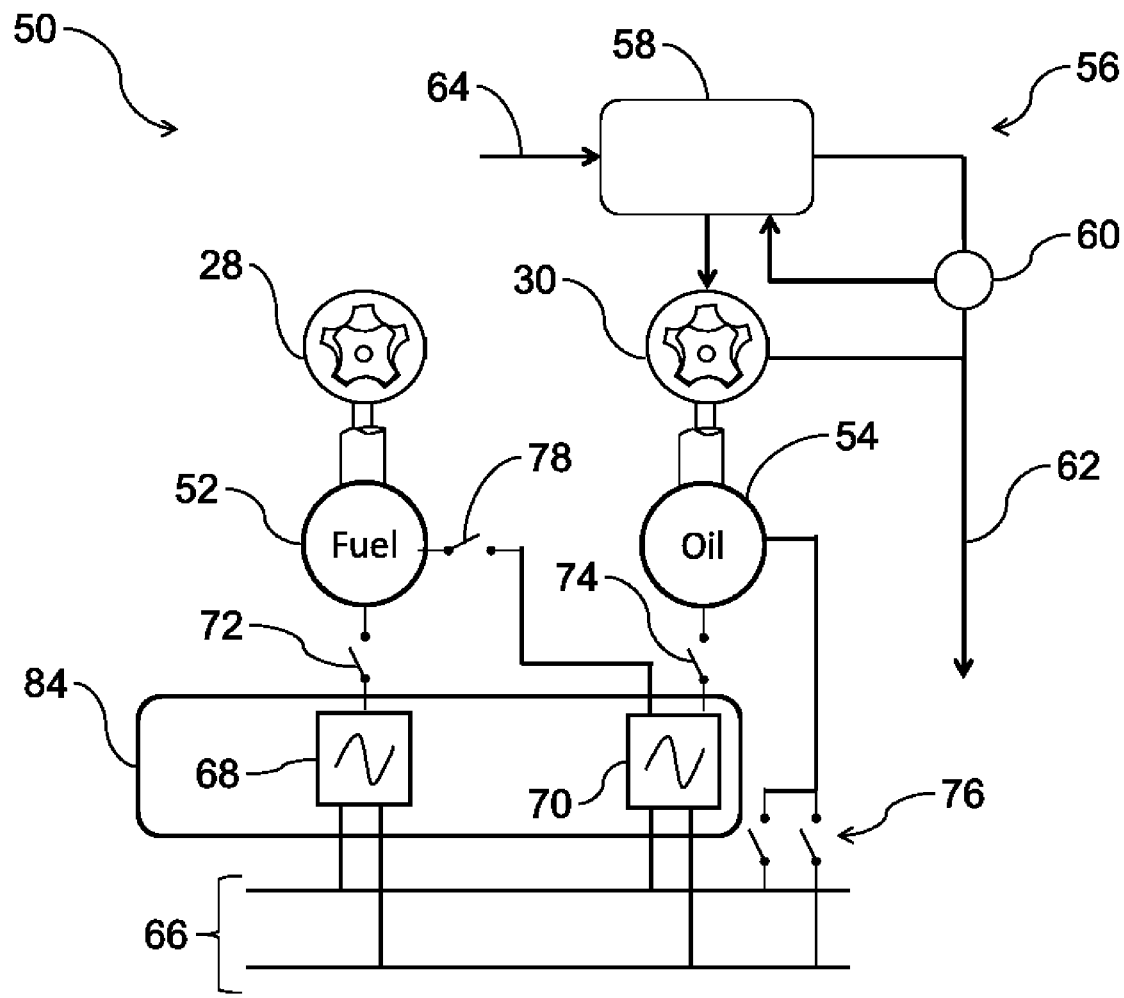
FIG. 8 is a schematic illustration of the fuel and oil system as described herein including a cooling arrangement in a second configuration.

As shown in FIGS. 7 and 8, the fuel and oil system 50 may include a first cooling loop 80 arranged to cool the first electric motor controller 68 and a second cooling loop 82 arranged to cool the second electric motor controller 70. Advantageously, each cooling loop 80/82 may be optimized to the respective electric motor controller 68/70 it is arranged to cool. Alternatively, the fuel and oil system 50 may include a single common cooling loop 84 arranged to cool both the first electric motor controller 68 and the second electric motor controller 70. Advantageously, the common cooling loop 84 may include fewer parts than two separate loops 80/84.

The fuel and oil system 50 finds particular applicability in a gas turbine engine 10 for powering an aircraft because it provides full redundancy with significant weight reduction compared to the motor control system 26 shown in FIG. 2. However, it also finds application in gas turbine engines 10 used for other purposes, for example for marine and industrial applications; and in gas and diesel engines.

The fuel and oil system 50 also finds application in other industries in which two separate fluid pumping systems each have variable speed control of the pumps but one system can tolerate fixed speed control.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fuel and oil system comprising: a fuel pump; an oil pump; a first electric motor controller configured to supply a variable electrical drive; a second electric motor controller configured to supply a variable electrical drive, the first electric motor controller and the second electric motor controller being both selectively connected to the fuel pump; and a fixed electrical drive, the fixed electrical drive and the second electric motor controller being both selectively connected to the oil pump, the fixed electrical drive functioning as a backup upon a failure of one of the first electric motor controller or the second electric motor controller, the first electric motor controller and the second electric motor controller respectively, operating in conjunction with a motor of the fuel pump, detecting the failure by receiving no power supply or a reduced amount of power supply as compared to normal operation, wherein: in a first configuration, the fuel pump is connected to and driven by the first electric motor controller and the oil pump is connected to and driven by the second electric motor controller, in response to detecting the failure of the first electric motor controller by the first electric motor controller, the fuel and oil system switches into a second configuration by controlling a plurality of switches, in the second configuration the fuel pump is connected to and driven by the second electric motor controller and the oil pump is connected to and driven by the fixed electrical drive, and in response to detecting the failure of the second electric motor controller by the second electric motor controller, the fuel and oil system switches into a third configuration by controlling the plurality of switches, in the third configuration the fuel pump is connected to and driven by the first electric motor controller and the oil pump is connected to and driven by the fixed electrical drive.

2. The fuel and oil system as claimed in claim 1, further comprising a spill valve connected to an output of the oil pump.

3. The fuel and oil system as claimed in claim 1, wherein the first electric motor controller and the second electric motor controller are each a different type of electric motor controller.

4. The fuel and oil system as claimed in claim 2, wherein the first electric motor controller and the second electric motor controller are each a different type of electric motor controller.

5. The fuel and oil system as claimed in claim 1, further comprising a cooling arrangement.

6. The fuel and oil system as claimed in claim 5, wherein the cooling arrangement includes a first cooling loop arranged to cool the first electric motor controller and a second cooling loop arranged to cool the second electric motor controller.

7. The fuel and oil system as claimed in claim 5, wherein the cooling arrangement includes a common cooling loop arranged to cool both the first electric motor controller and the second electric motor controller.

8. A gas turbine engine comprising the fuel and oil system as claimed in claim 1.

9. A diesel engine comprising the fuel and oil system as claimed in claim 1.

\* \* \* \* \*